US007836297B2

(12) United States Patent
Karaoguz et al.

(10) Patent No.: US 7,836,297 B2
(45) **Date of Patent: *Nov. 16, 2010**

(54) SECURE ANONYMITY IN A MEDIA EXCHANGE NETWORK

(75) Inventors: Jeyhan Karaoguz, Irvine, CA (US); James Bennett, Laguna Beach, CA (US)

(73) Assignee: Broadcom Corp., Irvine, CA (US)

( * ) Notice: Subject to any disclaimer, the term of this patent is extended or adjusted under 35 U.S.C. 154(b) by 1892 days.

This patent is subject to a terminal disclaimer.

(21) Appl. No.: 10/675,774

(22) Filed: Sep. 30, 2003

(65) Prior Publication Data

US 2004/0117661 A1 Jun. 17, 2004

Related U.S. Application Data

(60) Provisional application No. 60/432,472, filed on Dec. 11, 2002, provisional application No. 60/443,894, filed on Jan. 30, 2003, provisional application No. 60/461,717, filed on Apr. 10, 2003, provisional application No. 60/457,179, filed on Mar. 25, 2003, provisional application No. 60/465,982, filed on Apr. 28, 2003.

(51) Int. Cl.
*H04L 29/06* (2006.01)

(52) U.S. Cl. .......................... 713/155; 726/12; 726/19; 726/27

(58) Field of Classification Search ...................... None
See application file for complete search history.

(56) References Cited

U.S. PATENT DOCUMENTS

| | | | | |
|---|---|---|---|---|
| 5,974,453 | A * | 10/1999 | Andersen et al. | 709/220 |
| 6,061,666 | A * | 5/2000 | Do et al. | 705/43 |
| 6,502,193 | B1 * | 12/2002 | Barber | 726/4 |
| 6,774,926 | B1 | 8/2004 | Ellis et al. | |
| 2002/0016971 | A1 | 2/2002 | Berezowski et al. | |
| 2002/0065828 | A1 * | 5/2002 | Goodspeed | 707/100 |
| 2004/0003051 | A1 | 1/2004 | Krzyzanowski et al. | |
| 2005/0028208 | A1 | 2/2005 | Ellis et al. | |

* cited by examiner

*Primary Examiner*—Pramila Parthasarathy
(74) *Attorney, Agent, or Firm*—McAndrews, Held & Malloy, Ltd.

(57) ABSTRACT

Secure communication of information in a communication network may comprise acquiring a security code from a second communication device by a first communication device and receiving media containing the security code such as a pin code from the first communication device. The security code may be translated into an IP address corresponding to the second communication device. The received media may be routed to the second communication device based on the IP address of the second communication device. In this regard, the IP address of the second communication device remains anonymous or unknown to the first communication device. A duration for which the security code is valid may be limited to a specific time period and/or for a particular number of uses. Notwithstanding, the security code may be acquired out-of-band.

42 Claims, 14 Drawing Sheets

800

| | HOUR, DAY | | | | |
|---|---|---|---|---|---|
| CHANNELS | << 1PM | 2PM | ... | 6PM | 7PM >> |
| Family Vacations | | | | | |
| Kids sports | | | | | |
| ⋮ | | | | | |
| Vacation in Alaska Video 802 | Normal Estimated Delivery Time: 2 Hrs 13 mins Cost: $0.59 (Without Queuing) | | Showing All day (48 mins) Earliest Order Time: 4:00 PM MPEG-2, 1.5 Mbps | | |
| Vacation in Alaska Video 803 | Express Estimated Delivery Time: 18 mins Cost: $1.20 (With Queuing) | | Showing All day (48 mins) Earliest Order Time: 4:00 PM MPEG-2, 4 Mbps | | |
| Vacation in Alaska Video 804 | Overnight Delivery: available Next Morning Cost: $0.05 (Server Stored) | | Showing All day (48 mins) Earliest Order Time: 4:00 PM MPEG-2, 19 Mbps | | |

SECURE ANONYMITY IN A MEDIA EXCHANGE NETWORK

CROSS-REFERENCE TO RELATED APPLICATIONS/INCORPORATION BY REFERENCE

This application makes reference to, claims priority to, and claims the benefit of:

U.S. Provisional Application Ser. No. 60/432,472 filed Dec. 11, 2002;

U.S. Provisional Application Ser. No. 60/443,894 filed Jan. 30, 2003; and

U.S. Provisional Application Ser. No. 60/461,717 filed on Apr. 10, 2003;

U.S. Provisional Application Ser. No. 60/457,179 filed on Mar. 25, 2003; and

U.S. Provisional Application Ser. No. 60/465,982 filed Apr. 28, 2003;.

This application also makes reference to:

U.S. application Ser. No. 10/657,390 filed Sep. 8, 2003;

U.S. application Ser. No. 10/660,267 filed Sep. 11, 2003; and

U.S. application Ser. No. 10/675,081 filed Sep. 30, 2003.

All of the above stated applications are incorporated herein by reference in their entirety.

FIELD OF THE INVENTION

Certain embodiments of the invention relate to secure communication in a communication network. More specifically, certain embodiments of the invention relate to a method and system for secure anonymity in a media exchange network.

BACKGROUND OF THE INVENTION

Today, a personal computer (PC) user may receive many unwanted or unsolicited email messages, some of which may include file attachments, because the user's email address is widely disseminated, distributed and/or published. Some of the received email messages may contain computer viruses that may destroy files or otherwise cause harm to the user's PC. In an effort to minimize intrusion and harm, many businesses and some individual users set up firewalls that may be utilized to prevent or minimize a likelihood that certain types of email messages will be delivered to their personal computers and/or networks. This may help to prevent email messages that may be infected with computer viruses from being delivered to a personal computer or introduced within a network. However, in general, email addresses and IP addresses associated with a particular networked device may be easily determined and as a result, may be readily distributed. Accordingly, the identity of users and devices are readily ascertained and generally known by other users and devices.

Some users may also extract email addresses from emails such as electronic chain letters that may be sent and received. The extracted email addresses may be utilized to create larger email lists that are utilized to further distribute and disseminate unsolicited and unwanted emails. Moreover, emails that may be sent with attachments may contain scripts or executable code that may be further utilized to extract email addresses and/or IP addresses from remote personal computers and other networked devices. The email addresses may be extracted from address books or mail boxes and the IP address may be extracted from network settings that are stored on the personal computer. Once extracted, the email addresses and IP addresses may be freely distributed and disseminated.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for secure communication of information in a communication network. The method may comprise acquiring a security code from a second communication device by a first communication device and receiving media that contains the security code such as a pin code from the first communication device. The security code may be translated into an IP address corresponding to the second communication device. The received media may be routed to the second communication device based on the Internet protocol (IP) address of the second communication device. In this regard, the IP address of the second communication device remains anonymous with respect to the first communication device. In accordance with an embodiment of the invention, a duration for which the security code is valid may be limited to a specific time period and/or for a particular number of uses. Notwithstanding, the security code is acquired out-of-band.

Another embodiment of the invention may provide a machine-readable storage, having stored thereon, a computer program having at least one code section for providing secure communication of information in a communication network. The at least one code section may be executable by a machine, thereby causing the machine to perform the steps as described above for providing secure communication of information in a communication network.

The system for secure communication of information in a communication network may comprise at least one processor that may be adapted to acquire a security code from a second communication device by a first communication device. The processor may also receive media containing the security code, for example, a pin code from the first communication device. The processor may translate the security code to an IP address corresponding to the second communication device. The received media may then be routed to the second communication device based on the IP address of the second communication device. In this regard, the IP address of the second communication device remains anonymous to the first communication device. In accordance with an aspect of the invention, a duration for which the security code is valid may be limited to a specific period of time and/or a particular number of uses. The acquired security code may be obtained out-of-band. The processor may be a server, a media exchange server or a proxy server.

Another embodiment of the invention may provide a method for secure communication of information in a communication network. The method may comprise the steps of receiving a security code from a first communication device desiring to communicate with a second communication device and transferring security information associated with the second communication device to the first communication device. Media may be received along with at least a portion of the transferred security information from the first communication device. If the security information from the first communication device is valid, then media from the first communication device may be transferred to the second communication device.

The security information may be a one-time certificate and the security information may comprise a device ID, a public key, a code, a device number and/or a public key. The security code may be transferred out-of-band between the first communication device and the second communication device. The received media may be temporarily stored until the security information received from the first communication device is validated. At least a portion of the transferred security information received from the first communication device may be translated into an IP address of the second device and the media from the first communication device may be transferred to the second communication device utilizing the IP address of the second device. In this regard, the IP address of the second communication device remains anonymous or is not disclosed to the first communication device.

Another embodiment of the invention may provide a machine-readable storage, having stored thereon, a computer program having at least one code section for providing secure communication of information in a communication network. The at least one code section may be executable by a machine, thereby causing the machine to perform the steps as described above for secure communication of information in a communication network.

The system for secure communication of information in a communication network may comprise at least one processor that receives a security code from a first communication device desiring to communicate with a second communication device. The processor may transfer security information associated with the second communication device to the first communication device and receive media along with at least a portion of the transferred security information from the first communication device. If the security information from the first communication device is valid, the processor may transfer media from the first communication device to the second communication device. In an aspect of the invention, the security information may be a one-time certificate. The security information may further comprise a device ID, a public key, a code, a device number and/or a public key. The security code may be transferred out-of-band between the first communication device and the second communication device.

The processor may be adapted to temporarily store the received media until the security information received from the first communication device is validated. The processor may translate at least a portion of the transferred security information received from the first communication device into an IP address of the second device. The transfer of the media from the first communication device to the second communication device may utilize the IP address of the second device and in this regard, the IP address of the second communication device remains anonymous or unknown to the first communication device. The processor may be a server, a media exchange server or a proxy server.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

DETAILED DESCRIPTION OF THE INVENTION

Figure 1A:
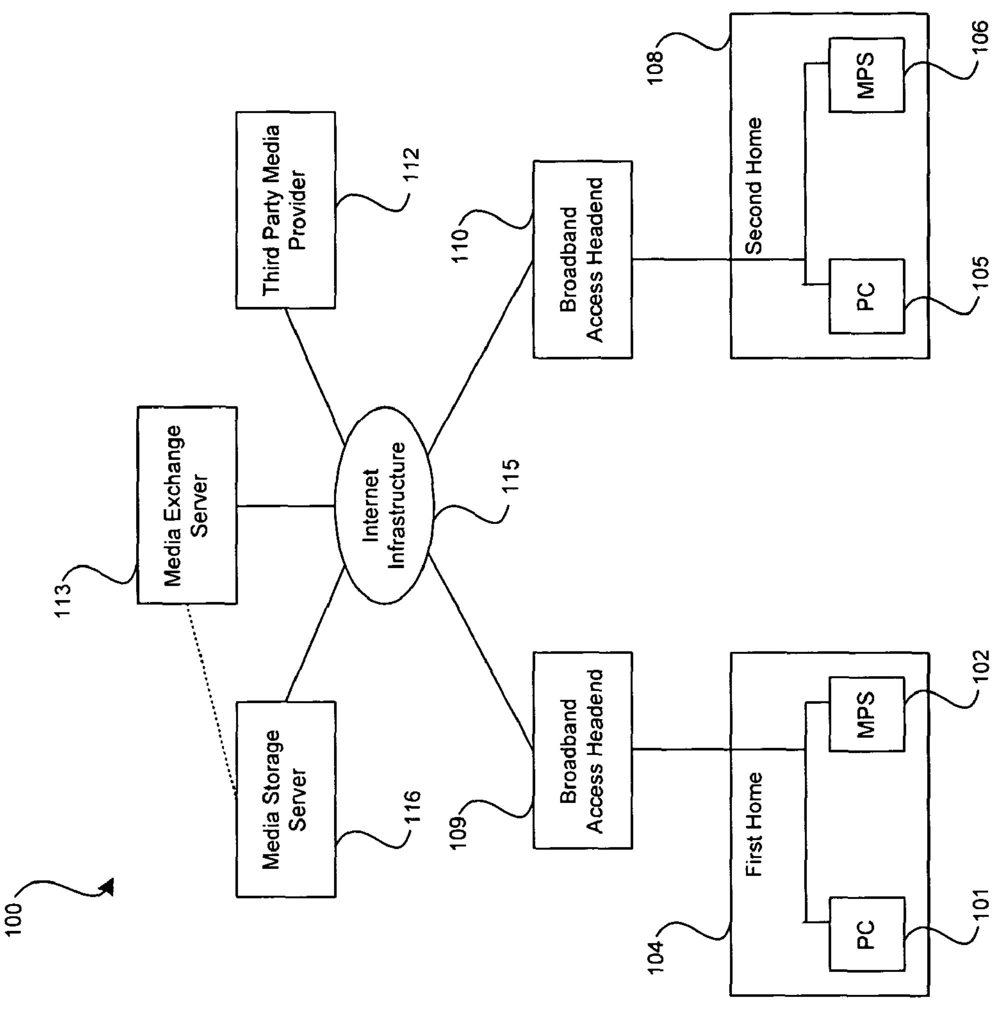
FIG. 1A is a diagram illustrating an embodiment of a network for communicating media 100 or a media exchange network 100 that may be utilized in connection with supporting secure anonymity, in accordance with various aspects of the present invention.

Certain embodiments of the invention may be found in a method and system for providing secure communication of information by keeping an identity of a network device anonymous. Other aspects of the invention may provide a method and system for secure anonymity in a communication network that may be utilized for the communicating media. The communication network for communicating media may be referred to as a media exchange network.

In accordance with an embodiment of the invention, secure communication of information in a communication network may comprise acquiring a security code from a second communication device by a first communication device. Media containing the security code such a pin code may be received from the first communication device device. The security code may be translated into an IP address corresponding to the second communication device. The received media may be routed to the second communication device based on the IP address of the second communication device. In this regard, the IP address of the second communication device remains anonymous or unknown to the first communication device. A duration for which the security code is valid may be limited to a specific time period and/or for a particular number of uses. Notwithstanding, the security code may be acquired out-of-band. Although the security code is translated into a IP address, the invention is not so limited. Accordingly, in the case of other protocols, the security code may be translated into other addresses such as a MAC address or device identifier.

Another embodiment of the invention may provide a method for secure communication of information in a communication network. The method may comprise receiving a security code from a first communication device desiring to communicate with a second communication device and transferring security information associated with the second communication device to the first communication device. Media may be received along with at least a portion of the transferred security information from the first communication device. If the security information from the first communication device is valid, then media from the first communication device may be transferred to the second communication device.

The security information may be a one-time certificate and the security information may comprise a device ID, a public key, a code, a device number and/or a public key. The first communication device and the second communication device may transfer or exchange the security code out-of-band. The received media may be temporarily stored until the security information received from the first communication device is validated. At least a portion of the transferred security information received from the first communication device may be translated into an IP address of the second device and media from the first communication device may be transferred to the second communication device utilizing the IP address of the second device. In this regard, the IP address of the second communication device remains anonymous or is not disclosed to the first communication device.

FIG. 1A is a diagram illustrating an embodiment of a network for communicating media 100 or a media exchange network 100 that may be utilized in connection with supporting secure anonymity, in accordance with various aspects of the present invention. Referring to FIG. 1A, the media exchange network 100 may include a PC 101 and a media processing system (MPS) 102 situated at a first location such as a first ($1^{st}$) home 104. The media exchange network 100 may also include a PC 105 and a media processing system 106 located at a second location such as a second ($2^{nd}$) home 108. The PC 101 and the media processing system 102 may be interfaced with a broadband access headend 109. The broadband access headend 109 may include a cable headend, a satellite headend, or an xDSL headend, in accordance with various embodiments of the invention. The PC 101 and the media processing system 102 may include internal modems such as a cable modem and an xDSL modem, or other suitable interface devices that may facilitate communication with the broadband access headend 109. Optionally, the interface device such as a modem may be located externally to the PC 101 and/or the media processing system 102. A personal computer (PC) comprising media exchange software (MES) running on or being executed by the personal computer, may also be referred to as a media processing system. The personal computers 101, 105 may comprise desktop personal computers, laptop computers, handheld computers, persona digital assistants (PDA), or other computing devices.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the MPS or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

The PC 105 and the media processing system interface 106 may be coupled to a broadband access headend 110. The broadband access headend 110 may include a cable headend, a satellite headend or an xDSL headend, in accordance with various embodiments of the invention. The PC 105 and the media processing system 106 may include internal modems such as a cable modem, XDSL modem or other interface device that may facilitate communication with the broadband access headend 110. Optionally, the interface device may be a modem that may be externally coupled to the PC 105 and/or the media processing system 106.

The media exchange network 100 may also include a third ($3^{rd}$) party media provider 112 and a media exchange server 113. In the case of a single central server arrangement, a single media exchange server may support the media exchange network 100. The broadband access headend 109, the broadband access headend 110, the third ($3^{rd}$) party media provider 112, and the media exchange server 113 may be coupled to the Internet infrastructure 115. In an embodiment of the invention a plurality of media exchange servers may be strategically situated at various points in the media exchange network 100. This may be referred to as a multiserver arrangement.

The media exchange network 100 may also include a media storage server 116 interfaced to the Internet infrastructure 115. The media storage server 116 that may communicate with the media exchange server 113 and may provide temporary and/or archival storage for digital media on the media exchange network 100. For example, the media storage server 116 may temporarily store or cache media files that are addressed to certain media processing systems and/or PC's on the media exchange network 100. In this regard, the media storage server may also store media and/or data for devices that are taken out of service or are otherwise disabled. Once a device is enabled or otherwise coupled to the media exchange network 100, the stored media may be transferred to the device.

The media exchange server 113 may provide various functions for the media exchange network 100 including device IP address registration, device ID registration, channel/program setup and management, serving as a proxy for anonymity, digital rights management, media caching/storage, and billing/tracking. In another aspect of the invention, the media exchange server 113 may be configured to hand-off peer-to-peer sessions between communication devices on the media exchange network 100 with certificates controlling session expiration. The media exchange server 113 may also have the capability to identify the locations of the various communication devices, for example, the personal computer 105 and the media processing system 102 by their physical connection to the media exchange network 100. The location of, for example, the PC 105, the media processing system 102 and/or media peripherals, may also be identified by their IP addresses by the media processing system 113.

The third ($3^{rd}$) party media provider 112 may include any of a number of providers of digital media or content including, but not limited to, an on-demand movie provider, an advertiser, and an on-demand music provider. The third ($3^{rd}$) party media provide may store, for example, movies, videos, user profile information and other media and/or information that may be provided to uses of the network for communicating media 100.

In accordance with an alternative embodiment of the invention, a broadband access headend may be upgraded to a media exchange headend by adding various functionalities. These added functionalities might facilitate the exchange of media on the media exchange network in conjunction with the media exchange server. Accordingly, these functionalities may include distributed networking capability, archival functionality, temporary storage, storage management and digital rights management. The archival functionality may include long term storage, while the temporary storage may aid in the distribution and touting of media.

The media exchange network 100 and the media exchange server 113 may provide functions that may be utilized to solve problems associated with authorizing and establishing secure media exchange links between devices such as PC's and media processing systems on the media exchange network 100. The various elements of the media exchange network 100 may include storage locations for digital media and/or data. The storage locations may include, for example, hard disk drives, a DVD player, a CD player, floppy disk drives, RAM, or any combination thereof. The storage locations may also include, for example, secure digital cards, memory sticks, PCMCIA cards, compact flash cards, or any combination of these. The PC's 101,105 may include desktop PC's, notebook PC's, PC tablets, handheld computers, PDA's, or any computing device.

The media processing systems 102, 106 are essentially enhanced set-top-boxes, for example. The media processing systems 102, 106 may each include a television screen or display for viewing and interacting with various user interfaces, media, data, and/or services that may be available on the media exchange network. User input or interaction may occur via a pointing device such as a mouse and/or a remote control. The PC's 101, 105 may each include a PC monitor for viewing and interacting with various user interfaces, media, data, and/or services that are available on the media exchange network using, for example, a keyboard and mouse. The media processing system 102, 106 and PC's 101, 105 may include functional software to support interaction with the media exchange server 113 on the media exchange network 100, in accordance with various embodiments of the present invention.

Other embodiments of the invention may include various combinations and/or multiple instances of the elements of FIG. 1, in accordance with various aspects of the invention. These may include but are not limited to media peripheral devices such as digital cameras, digital camcorders, MP3 players, WMA players, CD players and DVD players.

Figure 1B:
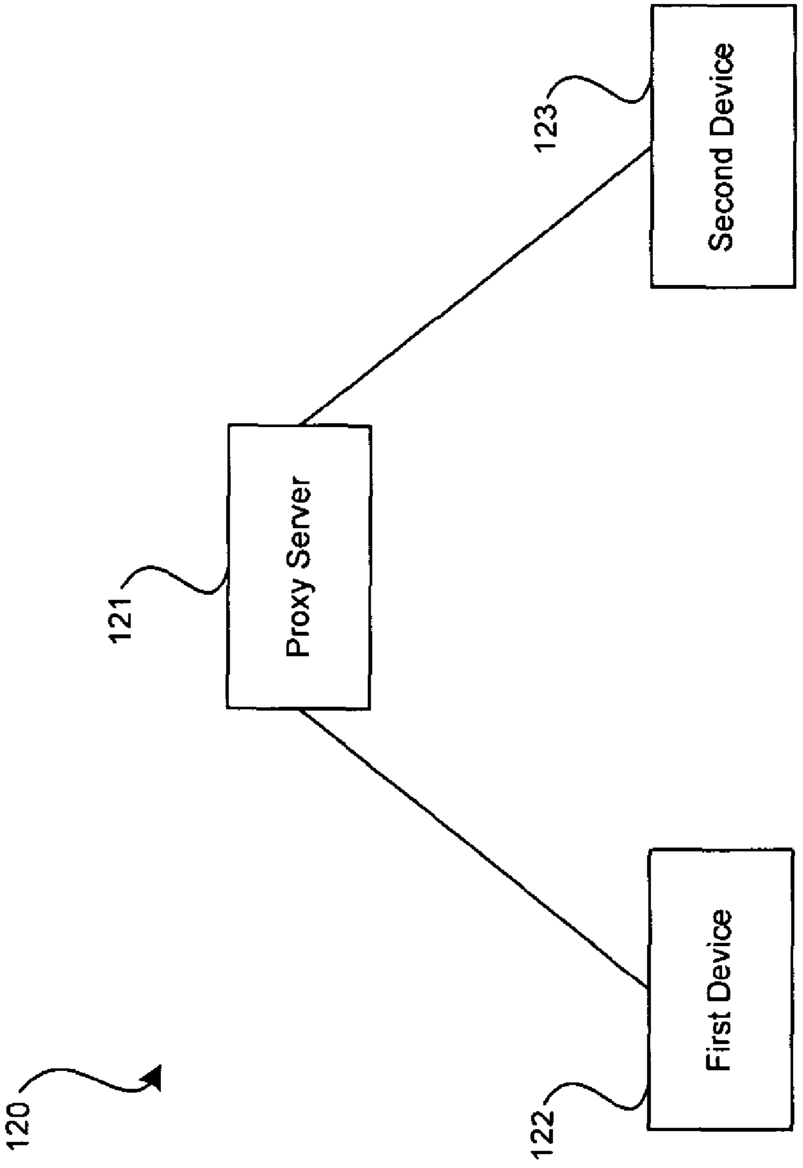
FIG. 1B is a block diagram illustrating an embodiment of a media exchange network 120 which comprises a simplified version of the media exchange network 100 of FIG. 1A that may be utilized in connection with secure anonymity, in accordance with an embodiment of the invention.

FIG. 1B is a block diagram illustrating an embodiment of a media exchange network 120 which comprises a simplified version of the media exchange network 100 of FIG. 1A that may be utilized in connection with secure anonymity, in accordance with an embodiment of the invention. Referring to FIG. 1B, the media exchange network 120 may comprise a proxy server 121, a first communication device 122 and a second communication device 123. The proxy server 121 that may correspond to the media exchange server 113 of FIG. 1A. The first communication device 122 and the second communication device 123 may correspond to, for example, media processing systems, media peripherals and/or personal computers on the media exchange network 100 of FIG. 1A.

The proxy server 121 may be configured to interface to the first communication device 122 and the second communication device 123. In accordance with an embodiment of the present invention, the interfaces between the first communication device 122, the second communication device 123 and the proxy server may include broadband access headends and an Internet infrastructure in accordance with the exemplary arrangements of FIG. 1A.

Figure 2A:
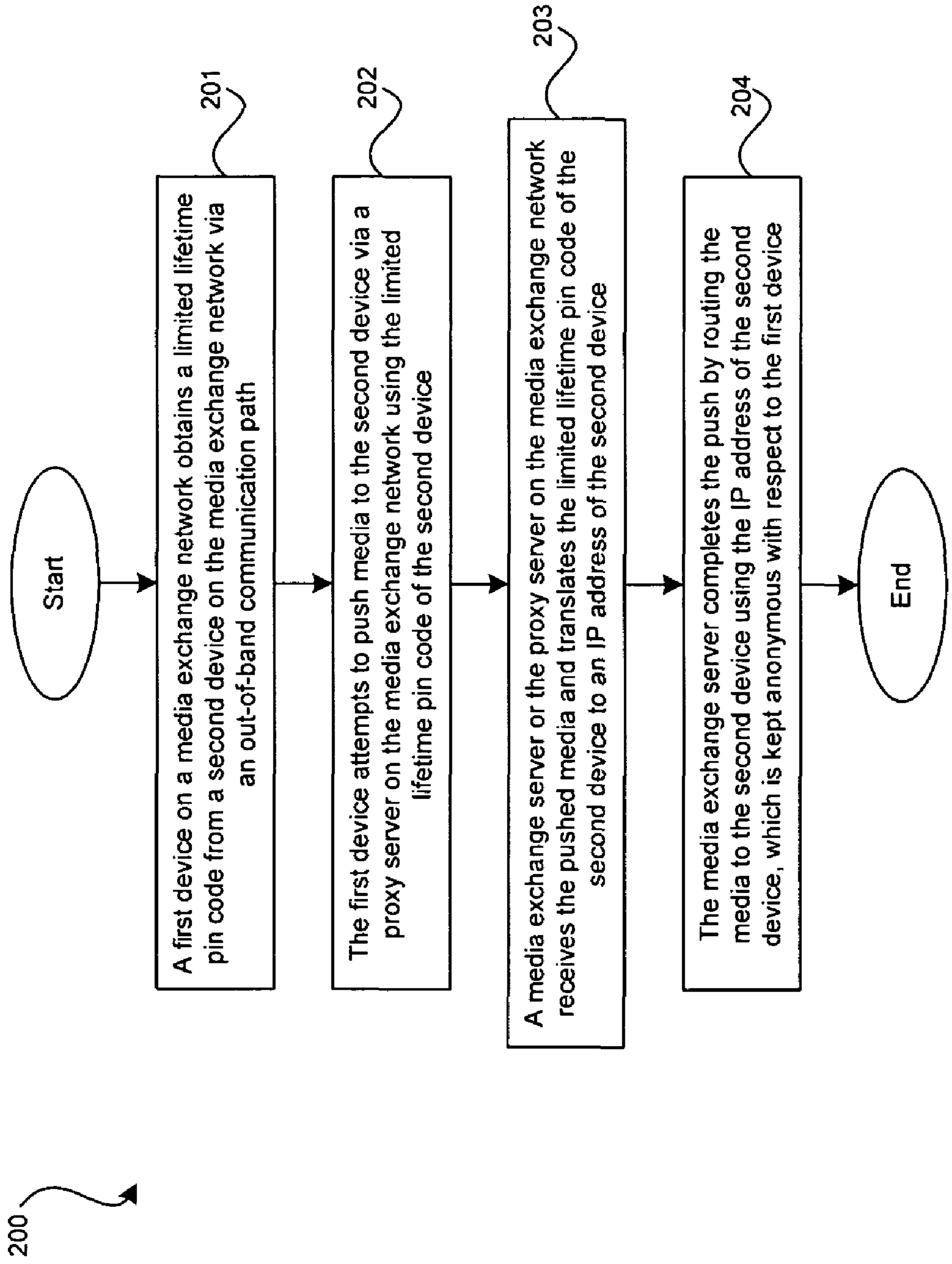
FIG. 2A is a flowchart illustrating an embodiment of an exemplary method 200 that may be utilized to provide secure anonymity using a proxy server on the media exchange network 120 of FIG. 1B, in accordance with various aspects of the invention.

FIG. 2A is a flowchart illustrating an embodiment of an exemplary method 200 that may be utilized to provide secure anonymity using a proxy server on the media exchange network 120 of FIG. 1B, in accordance with various aspects of the invention. Referring to FIG. 1B, in step 201, a first communication device on a media exchange network such as the network 100 of FIG. 1A, may obtain a limited lifetime pin code from a second communication device on the media exchange network via an out-of-band communication path. In step 202, the first device may attempt to push media to the second communication device via a proxy server such as the media exchange server 113 of FIG. 1A coupled to the media exchange network 100 utilizing the limited lifetime pin code of the second communication device.

In step 203, the proxy server on the media exchange network receives the pushed or otherwise communicated media containing the pin code of the second communication device and translates the limited lifetime pin code of the second communication device to an IP address of the second communication device. In step 204, the proxy server completes the push by routing the media to the second communication device using the IP address of the second communication device, which is kept anonymous with respect to the first device. Although a pin code is utilized in the exemplary steps of FIG. 2A, the invention is not so limited and any security information or code may be utilized. Additionally, although data is illustrated as being pushed, the data may be otherwise communicated between the first communication device 122, the proxy server 121 and the second communication device 123.

In general, with regard to communication of the limited lifetime pin code, a first communication device may establish a communication channel with a second communication device using a media exchange server or other server as a proxy. The communication channel may be maintained even after the limited lifetime pin code has expired. The communication channel may also be terminated by either device at any time. For example, the channel of communication may correspond to a channel in a channel guide or channel view.

U.S. application Ser. No. 10/675,057 filed on Sep. 30, 2003 illustrates various aspects of an exemplary channel view or channel that may be utilized in connection with invention and is hereby incorporated herein by reference in its entirety.

In accordance with various embodiments of the present invention, the limited lifetime pin code may be obtained by the second device from, for example, a web site on the media exchange network 100 of FIG. 1A, or by calling a telephone number associated with the media exchange network. The pin code may then be shared with other users of the media exchange network, via a telephone call or e-mail, for example.

In an illustrative embodiment of the invention, with reference to FIG. 1A and FIG. 1B, the proxy server 121 may comprise the media exchange server 113, the first device 122 may comprise the MPS 102, and the second device 123 may comprise the media processing system 106. A user of the media processing system 102 may call a user of the media processing system 106 on the telephone to obtain a limited lifetime pin code corresponding to the MPS 106. Obtaining or acquiring the pin code in this manner may be referred to as an out-of-band communication path since the pin code is not transferred over the communication channel. The pin code may have been originally obtained by the media processing system 106 from the media exchange server 113 and may have a limited lifetime of one week, for example.

The media processing system 102 attempts to push or otherwise communicate or transfer the media to the media processing system 106 over the media exchange network 100 by sending the media and the limited lifetime pin code of the media processing system 106 over the media exchange network 100. The media exchange server 113, acting as a proxy between the media processing system 102 and the media processing system 106, may intercept information associated with the push and may translate the limited lifetime pin code of the media processing system 106 to an IP address for the media processing system 106. In this regard, the media processing system 102 is unaware of the IP address of the media processing system 106. The media exchange server 113 completes the push of the media to the media processing system 106. In accordance with an embodiment of the invention, the limited lifetime pin code may have an indefinite lifetime by is limited to a particular device.

In accordance with an embodiment of the present invention, the media storage server 116 may be utilized by the media exchange server 113 to temporarily store the pushed media from the media processing system 102 until the media exchange server 113 has authorized the push or otherwise authorize the communication of the media to be transferred. In general, utilizing the media exchange server 113 as a proxy results in the IP address or other identifier of the media processing system 106 remaining anonymous to the media processing system 102. Also, the media processing system 106, for example, will generally not be able to independently push media back to the media processing system 102 without the media exchange server 113 acting as an intermediary for the purposes of anonymity, authentication, and/or media processing system authorization. This eliminates any unwanted and unsolicited communication between networked devices.

Figure 2B:
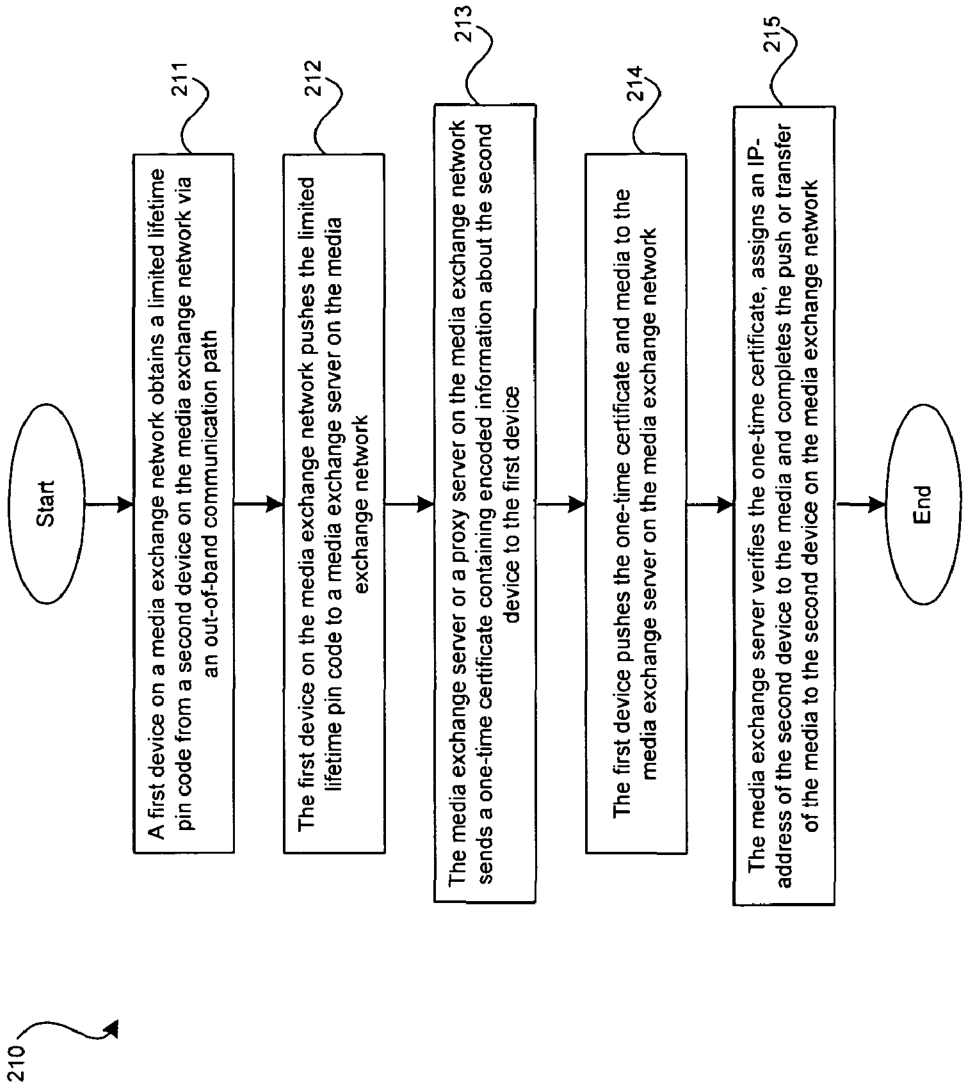
FIG. 2B is a flowchart illustrating an embodiment of an exemplary method 210 that may be utilized to provide secure anonymity using a proxy server and one-time certificates on the media exchange network 120 of FIG. 1B, in accordance with various aspects of the present invention.

FIG. 2B is a flowchart illustrating an embodiment of an exemplary method 210 that may be utilized to provide secure anonymity using a proxy server and one-time certificates on the media exchange network 120 of FIG. 1B, in accordance with various aspects of the present invention. In step 211, a first communication device on a media exchange network obtains a limited lifetime pin code from a second communication device on the media exchange network via an out-of-band communication path. In step 212, the first communication device on a media exchange network pushes or otherwise communicates the limited lifetime pin code to a media exchange server on the media exchange network. In step 213, the proxy server or media exchange server on the media exchange network, having verified the pin code, may send a one-time certificate containing encoded information associated with the second communication device to the first communication device. In step 214, the first communication device may push or otherwise communicate the one-time certificate and media to the proxy server on the media exchange network. In step 215, the proxy server may verify the one-time certificate, assign an IP address of the second device to the media, and completes the push or otherwise routes or transfers the media with the IP address of the second device to the second communication device on the media exchange network. In accordance with an embodiment of the invention, a one-time certificate may comprise information including a device ID number, a public key, a code, and possibly other information related to provided services.

In another illustrative embodiment of the invention, with reference to FIG. 1A and FIG. 1B, the proxy server 121 may comprise the media exchange server 113, the first communication device 122 may comprise the personal computer 105, and the second communication device 123 may comprise the media processing system 102. The user of the personal computer 105 may obtain a security code out-of-band from the user of the media processing system 105. The security code may be a limited lifetime pin code which may have been acquired via, for example, an e-mail. The personal computer 105 may push or otherwise communicate the pin code to the media exchange server 113. The media exchange server 113, upon receiving the pin code, may verify the authenticity of the received pin code and if properly verified, the media exchange server 113 may send security information to the personal computer 105. The security information may be a one-time certificate, for example. In this case, the one-time certificate may contain encoded information including, for example, a device ID, a code, and a public key corresponding to the media processing system 102. At this point, the personal computer 105 is now in possession of the one-time certificate for the media processing system 102 but cannot decode and understand the encoded information in the one-time certificate. The personal computer 105 is only knowledgeable of the fact that the one-time certificate corresponds to the media processing system 102.

The personal computer 105 may push or otherwise communicate media along with the one-time certificate to the media exchange server 113 over the media exchange network 100. The media exchange server 113 decodes and verifies the one-time certificate for the media processing system 102. If the one time certificate is properly verified or properly authenticated, the media exchange server 113 may push or otherwise communicate the media received from the personal computer 105 to the media processing system 102 over the media exchange network 100. Accordingly, the anonymity of the media processing system 102 is protected on the media exchange network. In this regard, the personal computer 105 cannot push media to the media processing system 102 unless the personal computer 105 first obtains a legitimate one-time certificate from the media exchange server 113. The media exchange server 113 may be adapted to function as a proxy between the personal computer 105 and the media processing system 102.

In accordance with an embodiment of the invention, the media storage server 116 may be utilized by the media exchange server 113 to temporarily store the pushed or otherwise communicated media from the personal computer 105 until the media exchange server 113 decodes and verifies the authenticity of the one-time certificate for the media processing system 102.

The one time certificate may be valid for a pre-defined period of time such as for one week from a time of its issuance and/or for a pre-defined number of uses such as for ten pushes of media. For example, a user may obtain a digital certificate that may be valid for one month in order to receive media from a particular third ($3^{rd}$) party provider on the media exchange network 100. After the one month period, the digital certificate may expire and the third ($3^{rd}$) party provider may have no way to find or contact the user. In this regard, the user remains anonymous, for example, with regard to the user's email and/or IP address or other device identification.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
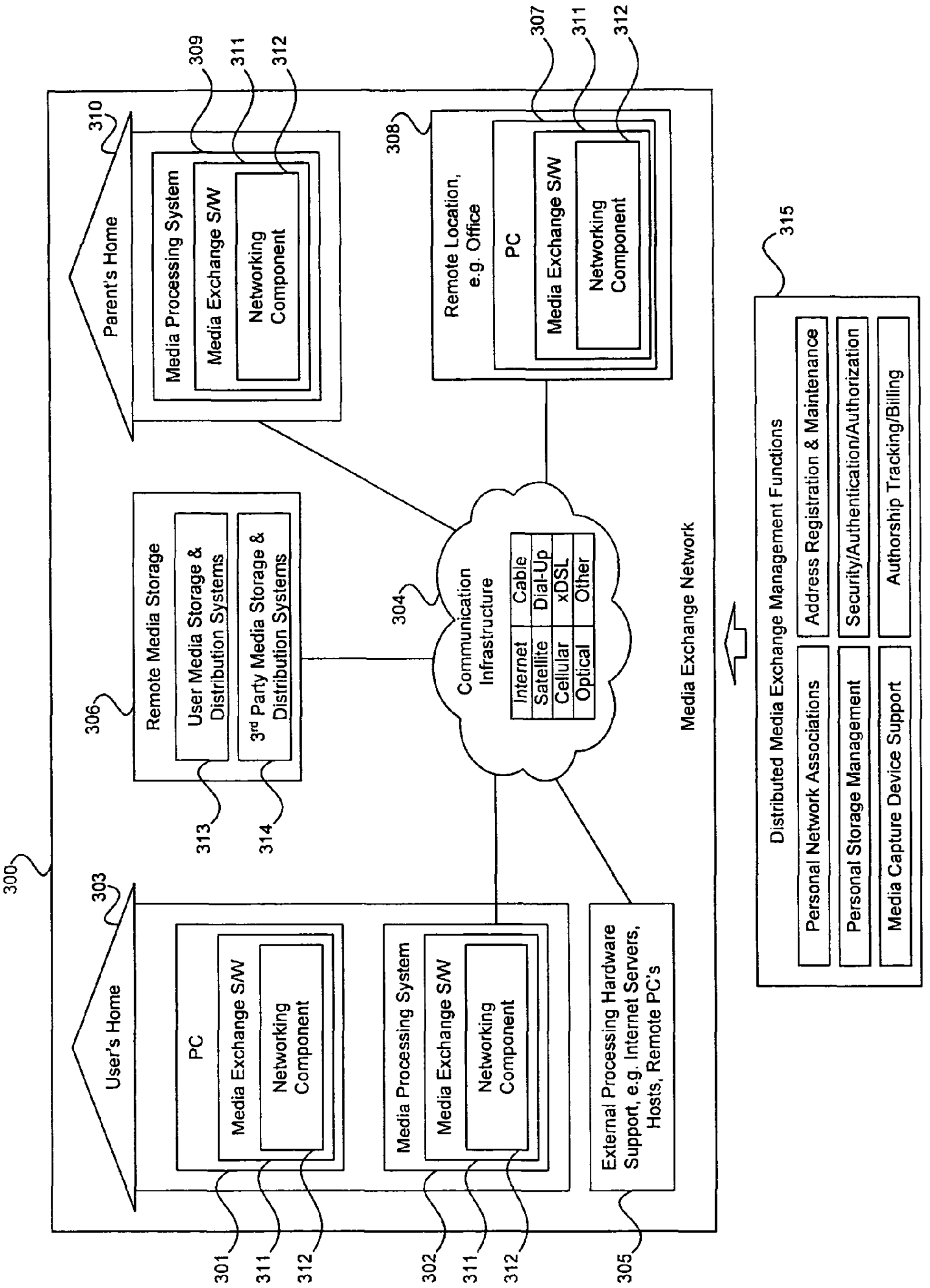
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
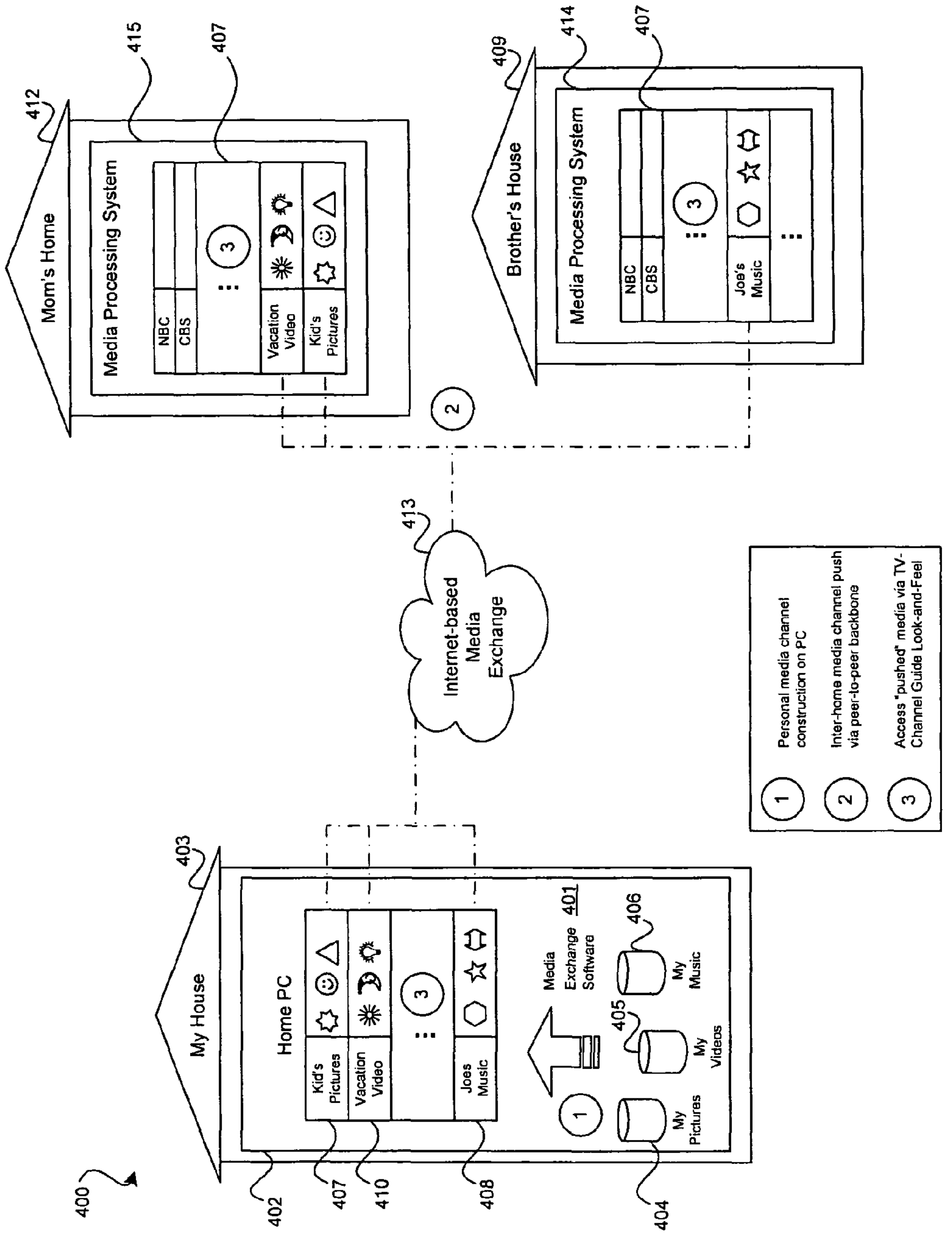
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
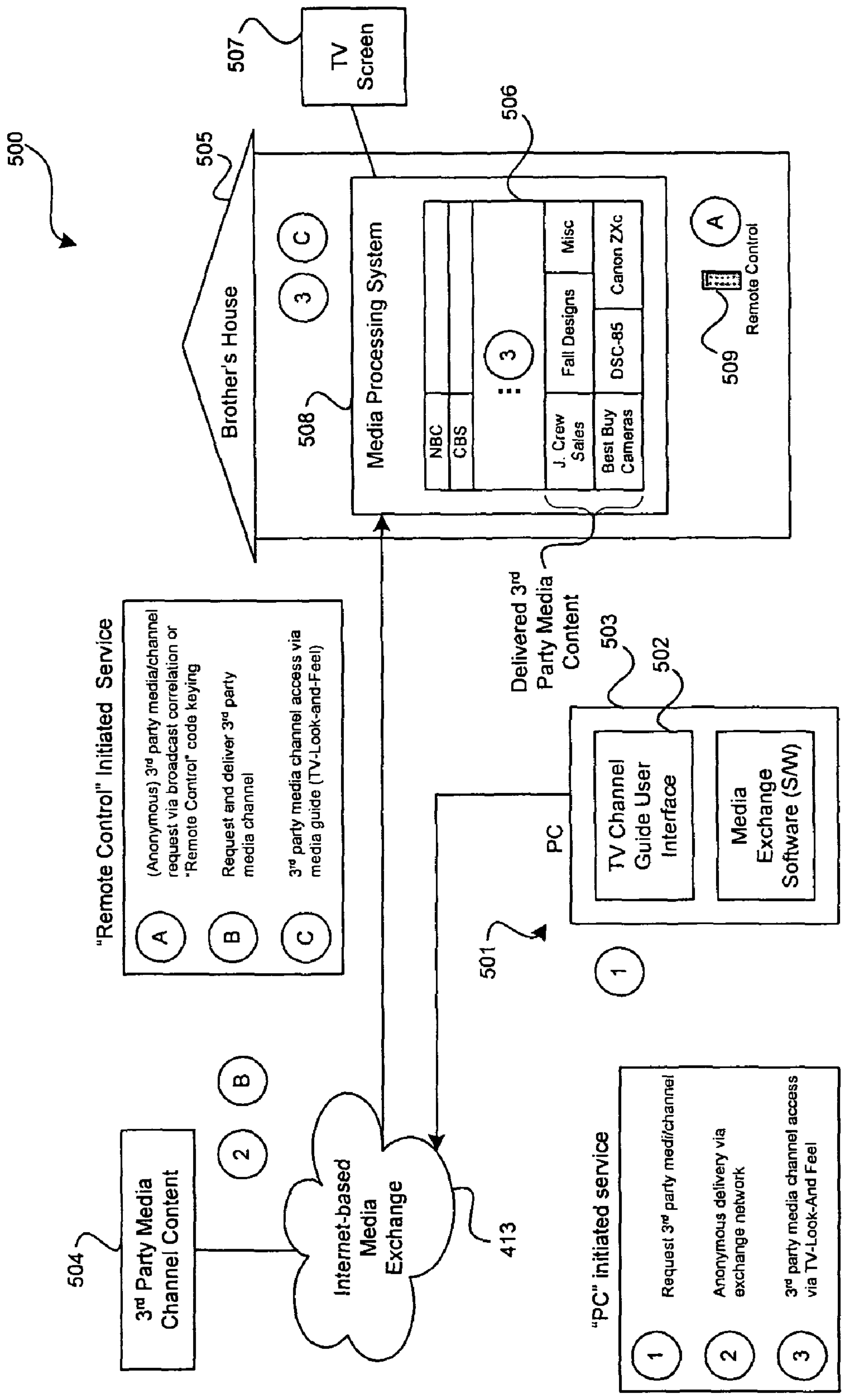
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
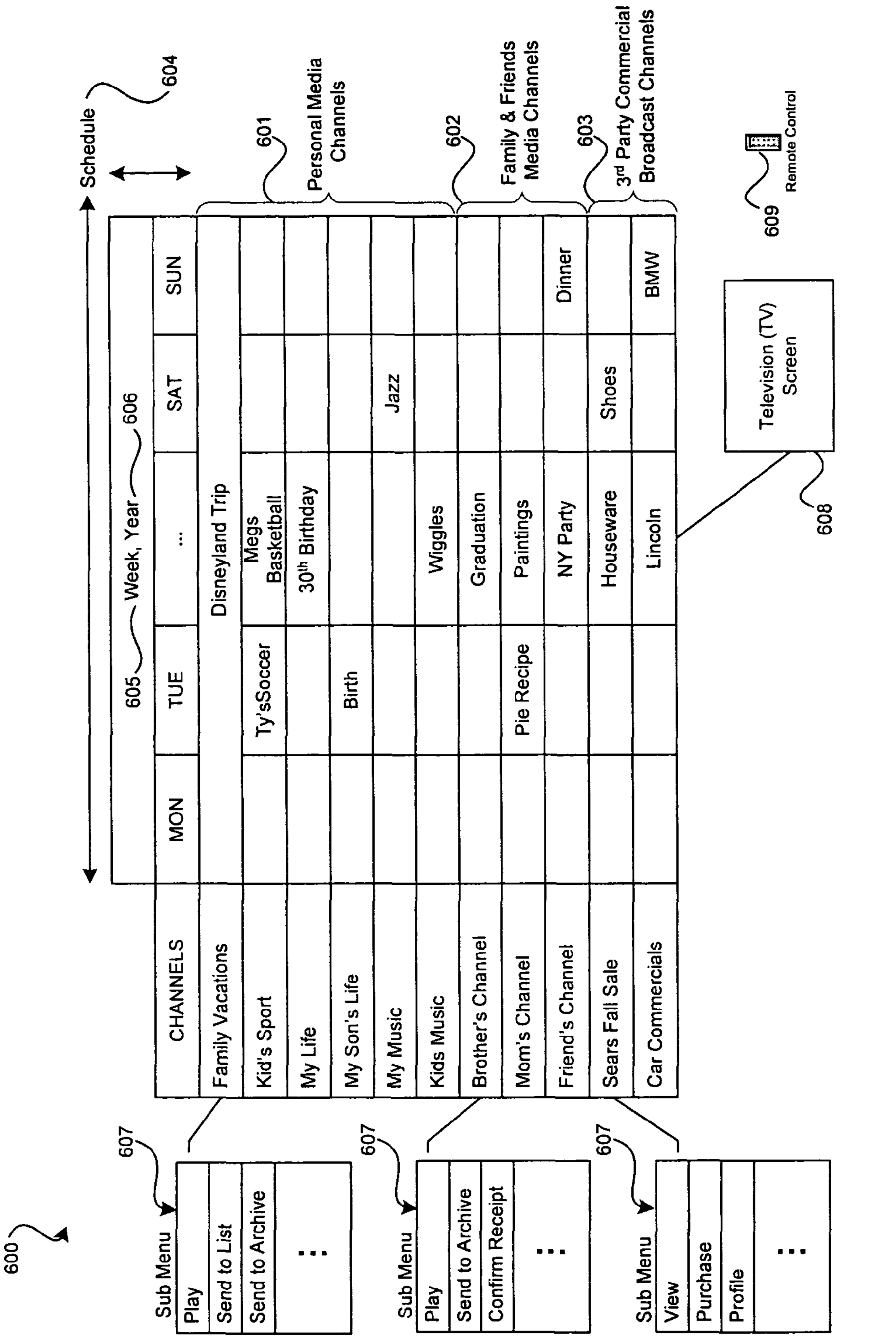
FIG. 6 is an exemplary illustration of a TV guide channel user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
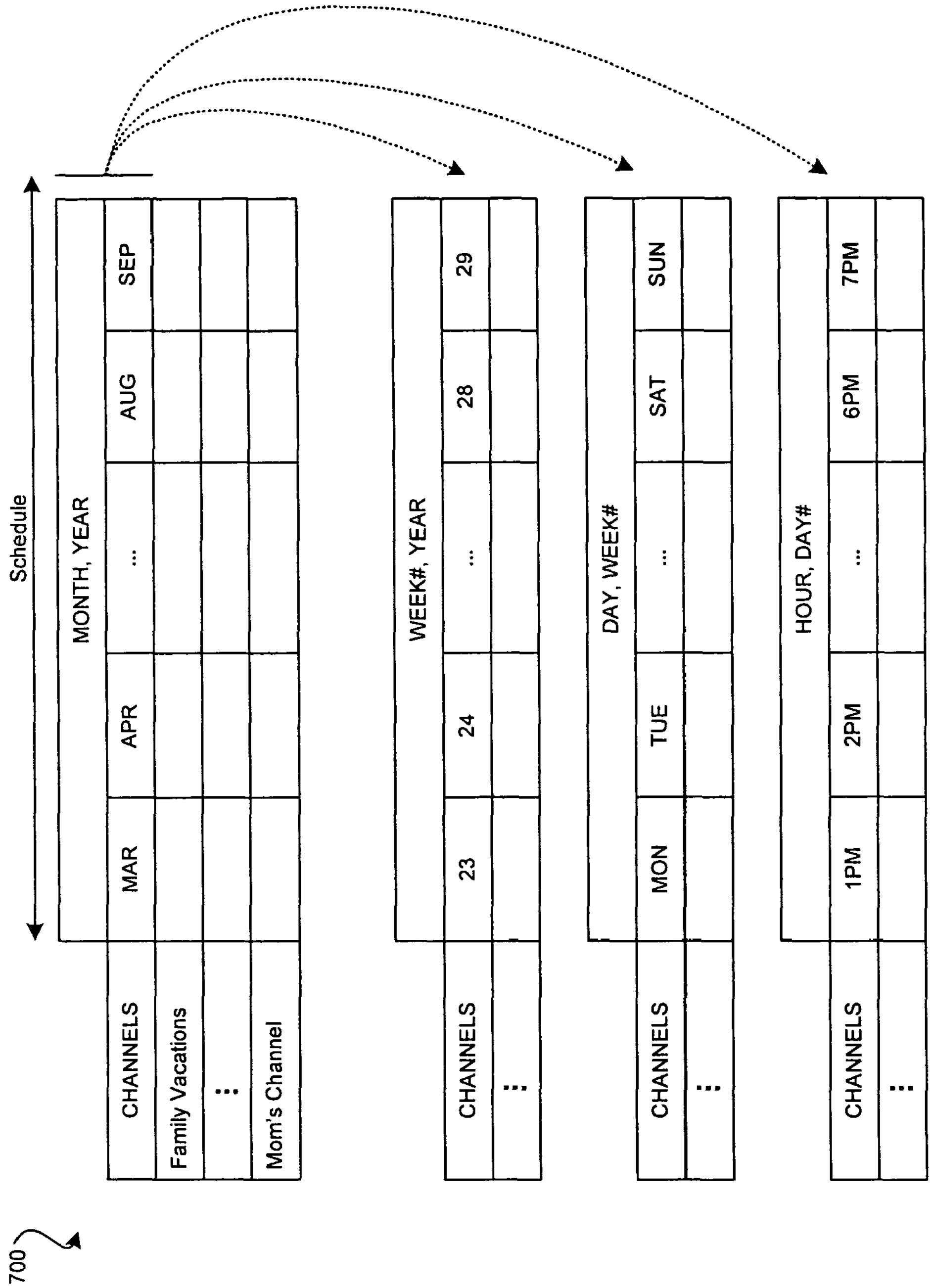
FIG. 7 is an exemplary illustration of several instantiations of a TV guide channel user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
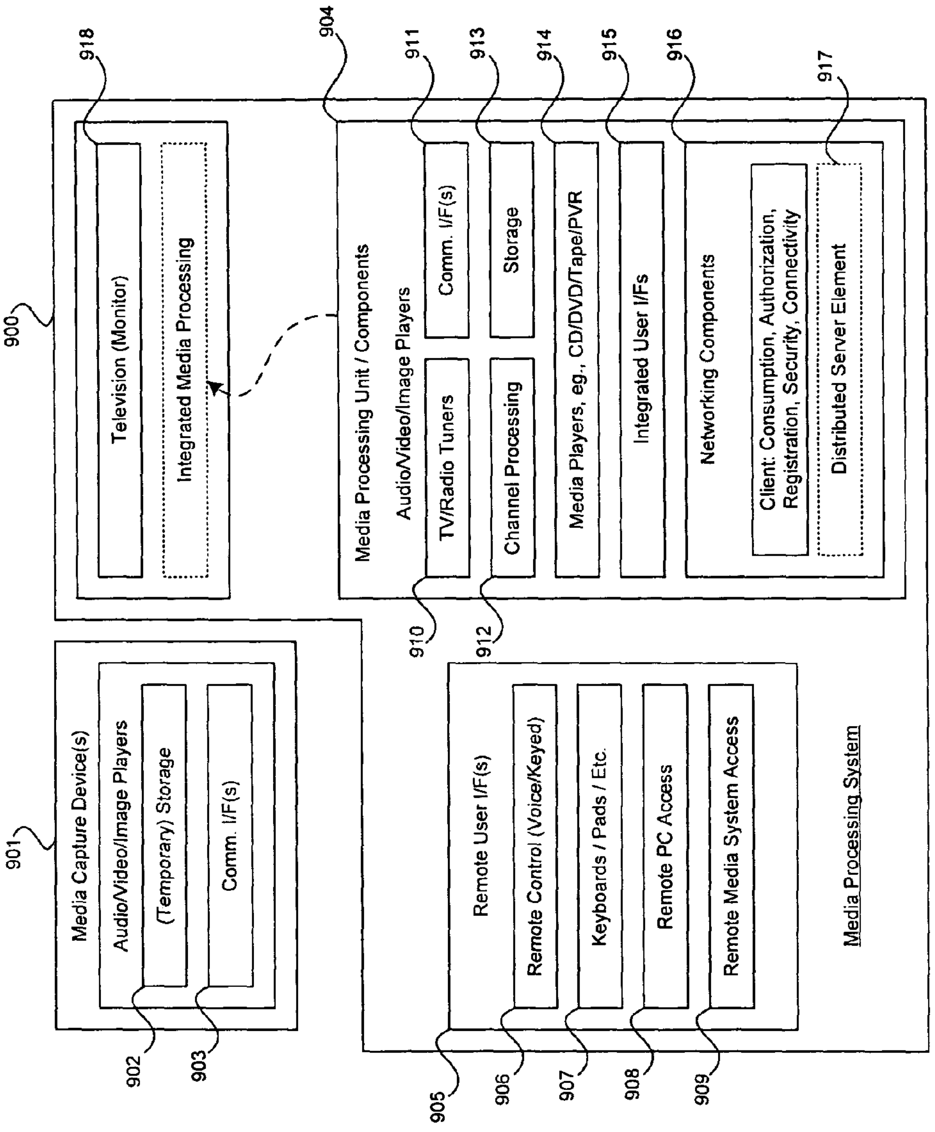
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
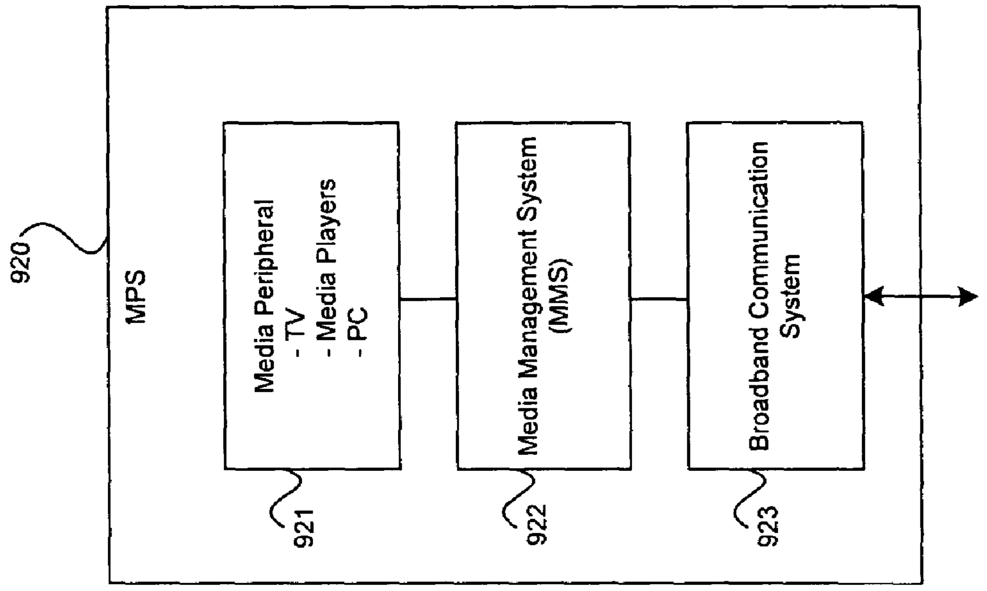
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
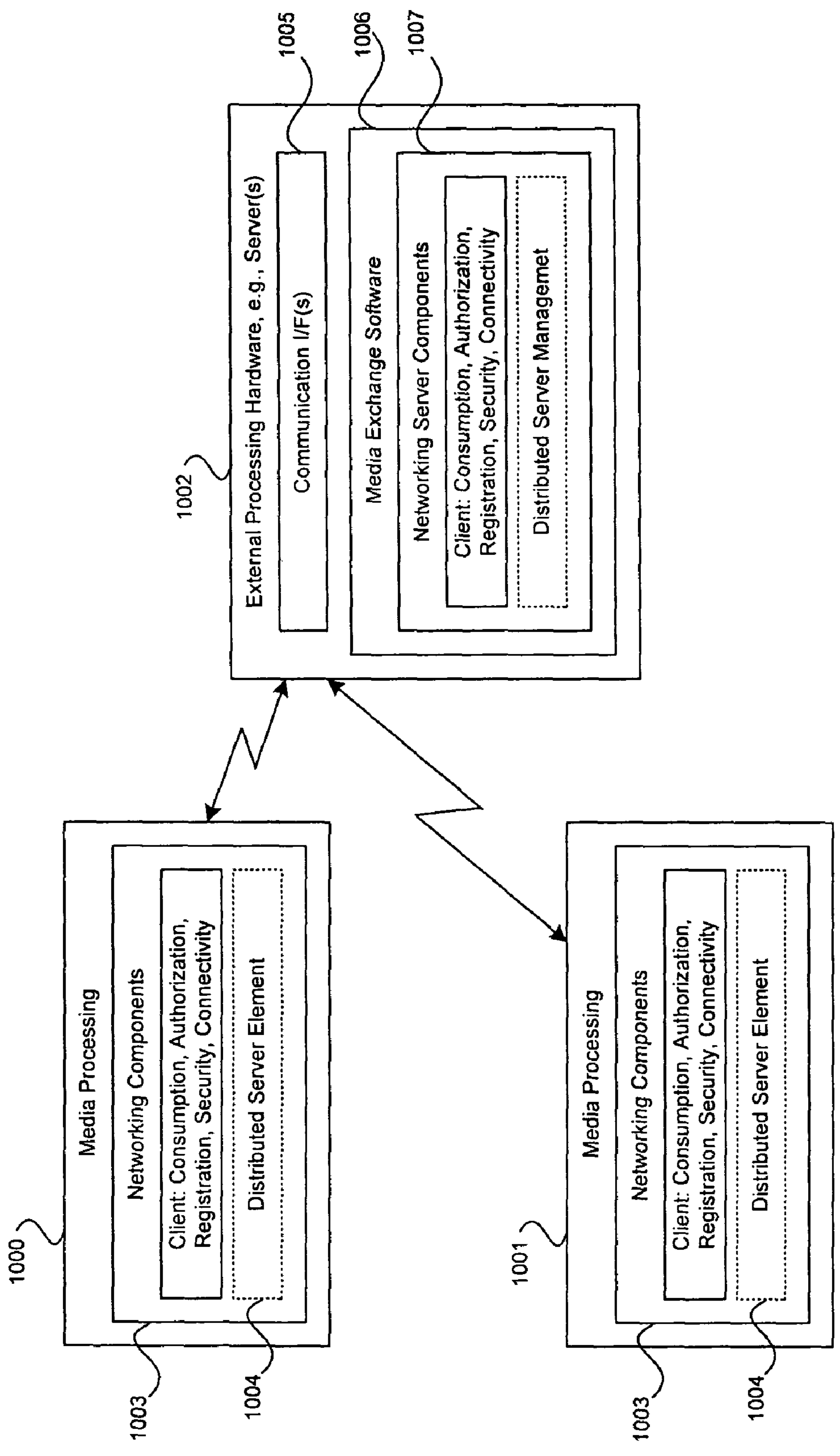
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
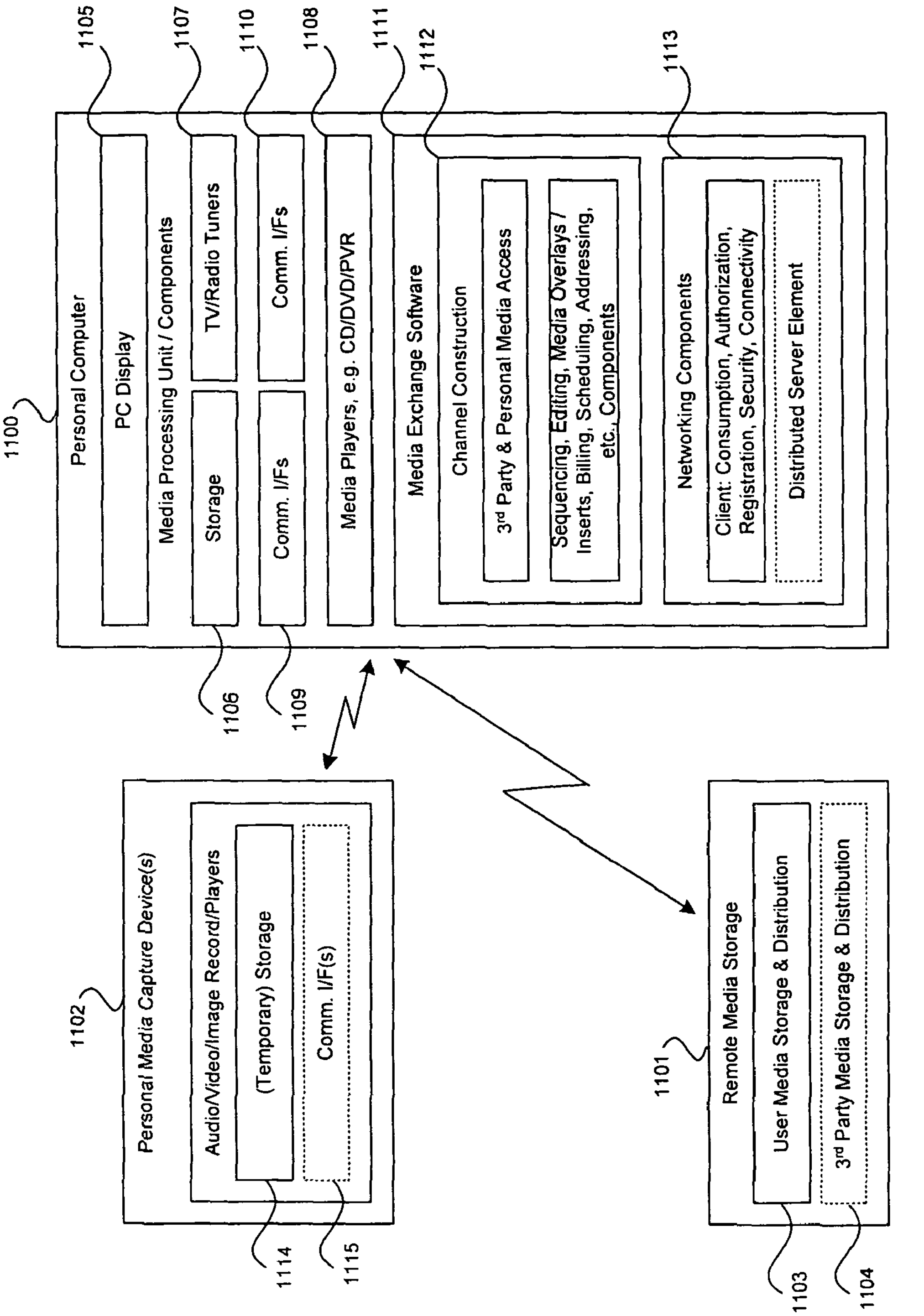
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

The invention may also include a system for secure communication of information in a communication network and my comprise at least one processor that may be adapted to acquire a security code from a second communication device by a first communication device. The processor may receive media containing the security code, for example, a pin code from the first communication device. The processor may translate the security code to an IP address corresponding to the second communication device. The received media may then be routed to the second communication device based on the IP address of the second communication device. In this regard, the IP address of the second communication device remains anonymous to the first communication device. A duration for which the security code is valid may be limited to a specific period of time and/or a particular number of uses. In this regard, the processor may be utilized to control the duration of validity of the security code. The acquired security code may be obtained out-of-band. The processor may be a server, a media exchange server or a proxy server.

The system for secure communication of information in a communication network may comprise at least one processor that receives a security code from a first communication device desiring to communicate with a second communication device. The first communication device and the second communication device may transfer or exchange the security code out-of-band. The processor may be a server, a media exchange server or a proxy server. The processor may be adapted to transfer security information associated with the second communication device to the first communication device and receive media along with at least a portion of the transferred security information from the first communication device. If the security information from the first communication device is valid, the processor may transfer media from the first communication device to the second communication device. In an aspect of the invention, the security information may be a one-time certificate and may further comprise a device ID, a public key, a code, a device number and/or a public key. The processor may be adapted to temporarily store the received media until the security information received from the first communication device is validated.

The processor may also be configured to translate at least a portion of the transferred security information received from the first communication device into an IP address of the second device. The transfer of the media from the first communication device to the second communication device may utilize the IP address of the second device and in this regard, the IP address of the second communication device remains anonymous or unknown to the first communication device.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for secure communication of information in a communication network, the method comprising:

receiving media containing a security code from a first communication device at a third communication device, wherein said security code is acquired by said first communication device from a second communication device;

translating said security code to an IP address corresponding to said second communication device at said third communication device; and routing said received media to said second communication device based on said IP address of said second communication device, said IP address of said second communication device remaining anonymous to said first communication device.

2. The method according to claim 1, wherein said security code is a pin code.

3. The method according to claim 1, comprising limiting a duration for which said security code is valid to at least one of time and a number of uses.

4. The method according to claim 1, comprising obtaining said acquired security code out-of-band.

5. A machine-readable storage having stored thereon, a computer program having at least one code section for secure communication of information in a communication network, the at least one code section being executable by a machine for causing the machine to perform steps comprising:

receiving media containing a security code from a first communication device at a third communication device, wherein said security code is acquired by said first communication device from a second communication device;

translating said security code to an IP address corresponding to said second communication device at said third communication device; and routing said received media to said second communication device based on said IP address of said second communication device, said IP address of said second communication device remaining anonymous to said first communication device.

6. The machine-readable storage according to claim 5, wherein said security code is a pin code.

7. The machine-readable storage according to claim 5, wherein said at least one code section comprises code for limiting a duration for which said security code is valid to at least one of time and a number of uses.

8. The machine-readable storage according to claim 5, wherein said at least one code section comprises code for obtaining said acquired security code out-of-band.

9. A system for secure communication of information in a communication network, the system comprising:

at least one processor receives media containing a security code from a first communication device at a third communication device, wherein said security code is acquired by said first communication device from a second communication device;

said at least one processor translates said security code to an IP address corresponding to said second communication device at said third communication device; and said at least one processor routes said received media to said second communication device based on said IP address of said second communication device, said IP address of said second communication device remaining anonymous to said first communication device.

10. The system according to claim 9, wherein said security code is a pin code.

11. The system according to claim 9, wherein a duration for which said security code is valid is limited in at least one of time and a number of uses.

12. The system according to claim 9, wherein said acquired security code is obtained out-of-band.

13. The system according to claim 9, wherein said at least one processor is at least one of a server, a media exchange server and a proxy server.

14. A method for secure communication of information in a communication network, the method comprising:

receiving a security code from a first communication device desiring to communicate with a second communication device at a third communication device;

transferring security information associated with said second communication device from said third device to said first communication device;

receiving media along with at least a portion of said transferred security information from said first communication device at said third communication device;

if said security information from said first communication device is valid, transferring said received media from said third communication device to said second communication device; and translating said at least a portion of said transferred security information received from said first communication device into an IP address of said second device at said third communication device, said transferring of said received media to said second communication device utilizing said IP address of said second communication device, said IP address of said second communication device remaining anonymous to said first communication device.

15. The method according to claim 14, wherein said security information is a one-time certificate.

16. The method according to claim 14, wherein said security information comprises at least one of a device ID, a public key, a code, a device number and a public key.

17. The method according to claim 14, wherein said security code is transferred out-of-band between said first communication device and said second communication device.

18. The method according to claim 14, comprising temporarily storing said received media until said security information received from said first communication device is validated.

19. A machine-readable storage having stored thereon, a computer program having at least one code section for secure communication of information in a communication network, the at least one code section being executable by a machine for causing the machine to perform steps comprising:

receiving a security code from a first communication device desiring to communicate with a second communication device at a third communication device;

transferring security information associated with said second communication device from said third device to said first communication device;

receiving media along with at least a portion of said transferred security information from said first communication device at said third communication device;

if said security information from said first communication device is valid, transferring said received media from said third communication device to said second communication device; and translating said at least a portion of said transferred security information received from said first communication device into an IP address of said second device at said third communication device, said transferring of said received media to said second communication device utilizing said IP address of said second communication device, said IP address of said second communication device remaining anonymous to said first communication device.

20. The machine-readable storage according to claim 19, wherein said security information is a one-time certificate.

21. The machine-readable storage according to claim 19, wherein said security information comprises at least one of a device ID, a public key, a code, a device number and a public key.

22. The machine-readable storage according to claim 19, wherein said security code is transferred out-of-band between said first communication device and said second communication device.

23. The machine-readable storage according to claim 19, wherein said at least one code section comprises code for temporarily storing said received media until said security information received from said first communication device is validated.

24. A system for secure communication of information in a communication network, the system comprising:

at least one processor at a third communication device that receives a security code from a first communication device desiring to communicate with a second communication device;

said at least one processor transfers security information associated with said second communication device from said third communication device to said first communication device;

said at least one processor receives media along with at least a portion of said transferred security information from said first communication device at said third communication device;

if said security information from said first communication device is valid, transferring said received media from said third communication device to said second communication device; and said at least one processor translates said at least a portion of said transferred security information received from said first communication device into an IP address of said second device at said third communication device, said transferring of said received media to said second communication device utilizing said IP address of said second device, said IP address of said second communication device remaining anonymous to said first communication device.

25. The system according to claim 24, wherein said security information is a one-time certificate.

26. The system according to claim 24, wherein said security information comprises at least one of a device ID, a public key, a code, a device number and a public key.

27. The system to claim 24, wherein said security code is transferred out-of-band between said first communication device and said second communication device.

28. The system according to claim 24, wherein said at least one processor temporarily stores said received media until said security information received from said first communication device is validated.

29. The system according to claim 24, wherein said at least one processor is at least one of a server, a media exchange server and a proxy server.

30. A method for secure communication of information in a communication network, the method comprising:

receiving media containing a security code from a first communication device, wherein said security code is acquired by said first communication device from a second communication device; and translating said security code received from said first communication device into an IP address of said second device at said third communication device, and transferring of said received media from said third communication device to said second communication device utilizing said IP address of said second device, said IP address of said second communication device remaining anonymous to said first communication device.

31. The method according to claim 30, wherein said security code is a pin code.

32. The method according to claim 30, comprising limiting a duration for which said security code is valid to at least one of time and a number of uses.

33. The method according to claim 30, comprising obtaining said acquired security code out-of-band.

34. A machine-readable storage having stored thereon, a computer program having at least one code section for secure communication of information in a communication network, the at least one code section being executable by a machine for causing the machine to perform steps comprising:

receiving media containing a security code from a first communication device, wherein said security code is acquired by said first communication device from a second communication device; and translating said security code received from said first communication device into an IP address of said second device at said third communication device, and transferring of said received media from said third communication device to said second communication device utilizing said IP address of said second device, said IP address of said second communication device remaining anonymous to said first communication device.

35. The machine-readable storage according to claim 34, wherein said security code is a pin code.

36. The machine-readable storage according to claim 34, wherein said at least one code section comprises code for limiting a duration for which said security code is valid to at least one of time and a number of uses.

37. The machine-readable storage according to claim 34, wherein said at least one code section comprises code for obtaining said acquired security code out-of-band.

38. A system for secure communication of information in a communication network, the system comprising:

at least one processor at a third communication device receives media containing a security code from a first communication device, wherein said security code is acquired by said first communication device from a second communication device; and said at least one processor translates said security code received from said first communication device into an IP address of said second device at said third communication device, and transferring of said received media from said third communication device to said second communication device utilizing said IP address of said second device, said IP address of said second communication device remaining anonymous to said first communication device.

39. The system according to claim 38, wherein said security code is a pin code.

40. The system according to claim 38, wherein a duration for which said security code is valid is limited in at least one of time and a number of uses.

41. The system according to claim 38, wherein said acquired security code is obtained out-of-band.

42. The system according to claim 38, wherein said at least one processor is at least one of a server, a media exchange server and a proxy server.

* * * * *